United States Patent [19]
Rosén

[11] Patent Number: 5,143,764
[45] Date of Patent: Sep. 1, 1992

[54] FLEXIBLE PACKING MATERIAL IN SHEET OR WEB FORM

[75] Inventor: Ake Rosén, Helsingborg, Sweden

[73] Assignee: Tetra Pak Holdings S.A., Pully, Switzerland

[21] Appl. No.: 385,178

[22] Filed: Jul. 26, 1989

[30] Foreign Application Priority Data

Aug. 1, 1988 [SE] Sweden ................ 8802777
Aug. 1, 1988 [SE] Sweden ................ 8802778

[51] Int. Cl.$^5$ .............................. B29D 9/00
[52] U.S. Cl. ......................... 428/36.5; 428/167; 428/516
[58] Field of Search .............. 428/36.5, 35.7, 167, 428/516

[56] References Cited

U.S. PATENT DOCUMENTS

| | | | |
|---|---|---|---|
| 3,861,994 | 1/1975 | Stark | 206/46 FC |
| 4,004,727 | 1/1977 | Rausing et al. | 229/4.5 |
| 4,447,479 | 5/1984 | Harrison et al. | 428/36.4 |
| 4,511,078 | 4/1985 | Rauser et al. | 229/17 R |
| 4,526,823 | 7/1985 | Farrell et al. | 428/36.4 |
| 4,559,257 | 12/1985 | Nilsson | 428/152 |
| 4,559,259 | 12/1985 | Cetrelli | 428/167 |
| 4,838,468 | 6/1989 | Lesse | 226/76 |

FOREIGN PATENT DOCUMENTS

| | | | |
|---|---|---|---|
| 717891 | 9/1965 | Canada | 428/36.4 |
| 0146503 | 6/1985 | European Pat. Off. | |
| 0284922 | 10/1988 | European Pat. Off. | |
| 3240338 | 5/1984 | Fed. Rep. of Germany | |
| 58-213037 | 12/1983 | Japan | |
| 1554143 | 10/1979 | United Kingdom | |
| 1554144 | 10/1979 | United Kingdom | |

*Primary Examiner*—Edith L. Buffalow
*Attorney, Agent, or Firm*—Burns, Doane, Swecker & Mathis

[57] ABSTRACT

Flexible, creased material in sheet or web form for use in the manufacture of liquid-tight packing containers of good dimensional rigidity comprises one or more base layers laminated to one another. The base layer is a mineral-filled thermoplastics material comprising between 50 and 80% calculated on the total weight of the mixture, of an inorganic, particulate mineral filler. The thermoplastics material is chosen among propylene-based polymers with a melt index of between 0.5 and 5 according to ASTM (2.16 kg, 230° C.) and the base layer or base layers are provided with a pattern of crease lines which have been formed by plastic deformation in connection with or immediately after the extrusion of the base layer or base layers.

7 Claims, 2 Drawing Sheets

FLEXIBLE PACKING MATERIAL IN SHEET OR WEB FORM

FIELD OF THE INVENTION

This invention relates to a flexible, creased material and more particularly, a flexible, creased material in sheet or web form for use in fabricating liquid-tight packing containers.

BACKGROUND OF THE INVENTION

In packing technology, packages of a non-returnable character which are manufactured from a material comprising a base layer of paper or cardboard with outer and inner coatings of thermoplastics have been used for a long time. The material in these so called non-returnable packages is often also provided with further layers of other material, e.g. Al-foil or plastic coatings other than those mentioned here.

The composition of the packing material is selected to create the best possible protection for the product which is to be packed. At the same time the composition is selected to give the required mechanical strength and durability to enable it to withstand such outer external stresses as the package is subjected to in normal handling. To achieve the necessary mechanical rigidity, which on the one hand gives mechanical protection to the product and on the other hand makes it possible for the package to be dimensionally rigid enough to allow it to be handled and manually gripped without difficulty, the material in these packages is frequently provided with a relatively thick base layer of paper or cardboard. Such a material, however, is not liquid or gas tight and the rigidity of the material is quickly lost when it is subjected to moisture. To impart the required liquid-tightness to the material the base layer is provided therefor, frequently on both sides, with a coating of plastic material, and if the plastic material is thermoplastics the coating may also be used for sealing the plastic coatings to one another by so-called heat-sealing. In this manner packages can be sealed and made lastingly permanent in their intended shape by heat-sealing together thermoplastic-coated, overlapping material panels in liquid-tight and mechanically durable sealing joints.

Non-returnable packages of the type referred to here are manufactured in most cases with the help of packing machines which, either from a web or from prefabricated blanks of a packing material, form, fill and seal finished packages at a high rate of production. Packages are manufactured, e.g. from a web by joining together the longitudinal edges of the web in an overlap joint so as to form a tube which is subsequently filled with the actual contents, and through repeated flattening and sealing of the tube, at right angles to the longitudinal axis of tube, is divided into closed packages. Finally, the packaging units are severed from one another by means of cuts in the transverse sealing zones and are given the desired geometrical shape, usually a parallellepiped, by further folding and sealing.

During the manufacture of packages in the manner described above the laminated material is subjected to stresses which become particularly large during folding of the material. During folding, and as a result of the relatively great material thickness of the base layer, the one plastic coating is subjected to a strong stretching force while at the same time, the other plastic coating is compressed to a corresponding degree along the folding line. Due to the great extensibility of the plastic coatings, the folding and resultant stretching of the plastic material only rarely leads to breaks or other damages causing leakage in the plastic coating. However, the problem is aggravated if the material also comprises an Al-foil layer which, compared with the plastic coatings, is not as stretchable and consequently tends to crack when the material is folded.

Even if a single 180° folding of the material normally does not have any serious consequences, considerable difficulties arise when the material is to be folded along two crossing crease lines. This is often the case in external sealing areas always occurring on this type of packages, irrespectively of whether they are manufactured from a web or from prefabricated blanks. The sealings generally are carried out by heating and melting the plastic coating facing towards the inside of the package along the edge zones which are to be sealed to one another. Thereafter the heated plastic coatings are pressed against one another to form a sealing fin held together through surface fusion on the outside of the package. Such a fin comprises double material layers, and to ensure that it does not form an obstacle, the fin frequently is folded down to lie flat against the outside of the package, which means that one of the material layers of the sealing fin is folded over a 180° and that the package wall in the region of the folded-down fin comprises three material layers, that is to say, has a threefold material thickness. Such a sealing fin often runs along one or more side faces of the package, and since these side faces in the forming of, for example, parallellepipedic packages are subjected to a 180° folding along a crease line at right angles to the sealing fin, the material thickness in certain regions of the package will be six times the laminate thickness. At this in the area of the 180° folding that is transverse to the sealing region the material layers located outermost will be subjected to very strong tensile stresses with accompanying extensions and increased risks of crack formation in the material. These tensile stresses frequently are so great that cracks occur not only in the Al-foil included in the material, but also in the thermoplastic coatings. Cracks in the thermoplastic coating can result in leakage of the packed contents which can readily be absorbed by, and impair the rigidity of, the base layer of the material.

OBJECTS AND SUMMARY OF THE INVENTION

Since conventional packing material based on paper or cardboard is obviously associated with serious disadvantages related essentially to the use of a fibrous layer which of necessity has to be relatively thick in order to impart mechanical rigidity to the material, it has been an object for a long time to find a new packing material for the manufacture of liquid-tight packing containers which does not include fibrous material but which nonetheless possesses good dimensional rigidity. It is an object of the present invention thus to provide directions concerning such packing material free of paper or cardboard.

It is a further object of the invention to provide a packing material which with the help of modern, high-capacity packing machines can be converted readily to liquid-tight, dimensionally rigid packing containers without the risk of crack formations when the material is folded during the manufacture of the containers.

These along with further objects are achieved in accordance with the present invention.

BRIEF DESCRIPTION OF THE DRAWINGS

The invention will be described in the following in more detail with special reference to the attached drawings, wherein like members bear like reference numerals and wherein:

FIG. 6 is a schematic illustration of an arrangement for the manufacture of the packing material in FIGS. 4 and 5a.

DETAILED DESCRIPTION OF THE PREFERRED EMBODIMENTS

Figure 1:
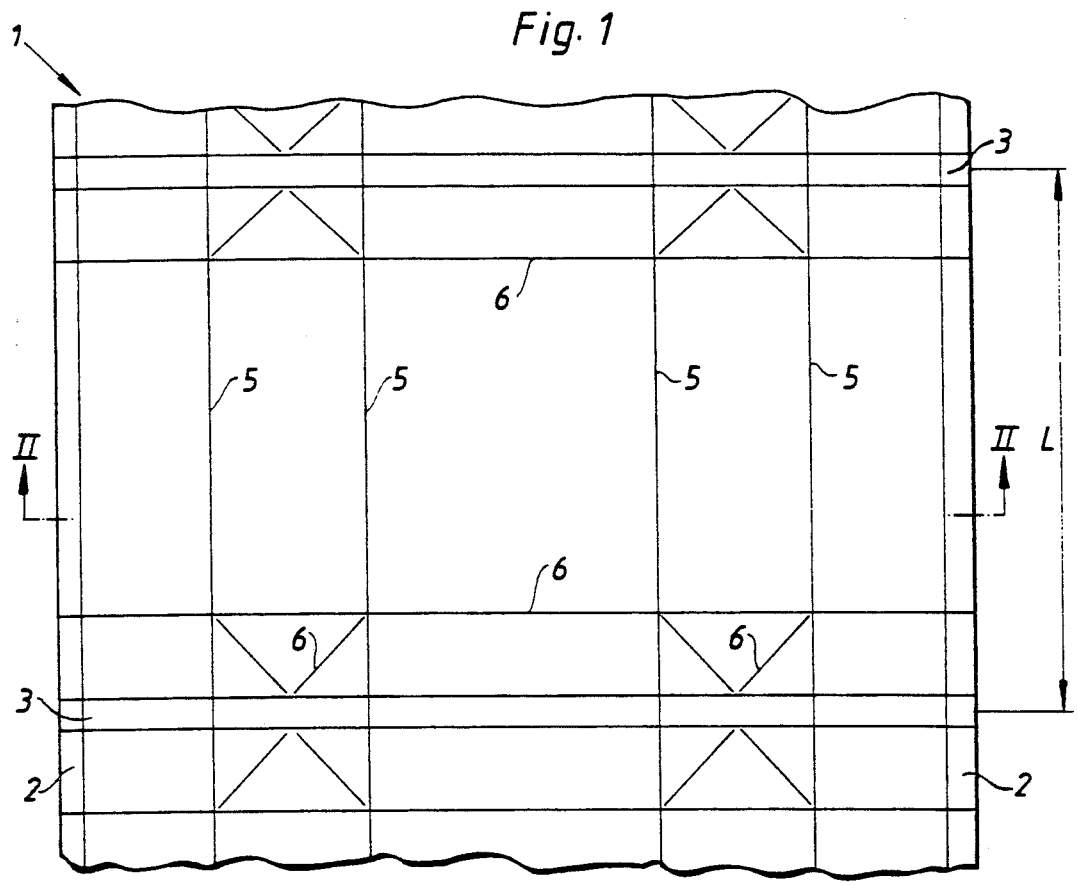
FIG. 1 is a plan view of a packing material in web form in accordance with one embodiment of present invention.

FIG. 1 shows a whole package length L of a material in web form according to the invention which has been given the general reference designation 1. From the web 1 are manufactured packing containers, as pointed out earlier, where both longitudinal edge zones 2 of the web 1 are joined to one another in an overlap joint so as to form a tube which subsequently is filled with the actual contents. The filled tube is divided thereafter into individual container units by means of repeated flattening and sealing of the tube along narrow transverse sealing zones 3 at right angles to the longitudinal axis of the tube. Finally the container units are separated from one another by cuts in the transverse sealing zones 3 and are given the desired shape, e.g. parallellepipedic, through a further forming and sealing operation.

Figure 2:
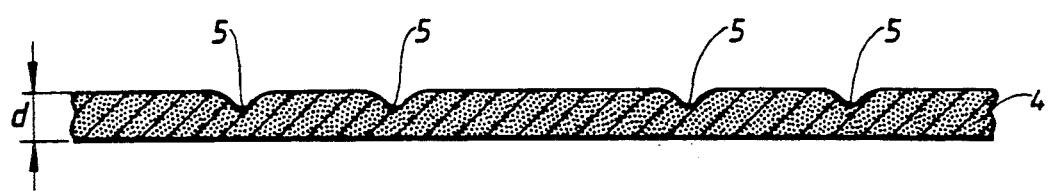
FIG. 2 is an enlarged cross-sectional view of the material in FIG. 1 along the sectional line II—II.

The material in accordance with this embodiment of the present invention, as is evident from FIG. 2, comprises a base layer 4 of mineral-filled propylene-based polymer with a melt index of between 0.5 and 5 according to ASTM (2.16 kg, 230° C.). The quantity of filler in the polymer may vary between 50 and 80% of the total weight of the mixture, but preferably is within 65-75% by weight, which has been found to produce optimum properties of the material with regard to rigidity and modulus of elasticity.

The propylene-based polymer may be a polypropylene homopolymer with a melt index of below 1 according to ASTM (2.16 kg, 230°), but preferably the propylene-based polymer is chosen among propylene-ethylene copolymers with a melt index within the above specified range of between 0.5 and 5 since those copolymers have been able to withstand folding and bending operations without cracking even at low temperatures which normally occur during the conversion of the packing material into fold packing containers and the subsequent filling of the fold packing containers with liquid food, such as milk.

The choice of filler is not critical in accordance with the invention, but, practically speaking, the whole range of known mineral fillers may be used, e.g. mica, talc, calcium salts such as calcium sulphate or calcium carbonate etc. A base layer containing 65% by weight of calcium carbonate in particle form with a grain size of under 10 μm, however, has been found to be the material combination that functions well in practice and that makes possible the manufacture of liquid-tight packing containers with the desired good dimensional rigidity. In practice, the material thickness d of the base layer may vary between 100 and 400 μm, but preferably amounts to 300 μm.

To facilitate the conversion of the web 1 to packing containers the base layer 4 has been provided with an arbitrary pattern of crease lines 5 and 6 for facilitating the folding, which respectively extend parallel and transversely to the longitudinal direction of the web. In the example shown the crease lines 5 and 6 have been formed by plastic deformation of the base layer 4 in connection with or immediately after extrusion of said layer.

Figure 3:
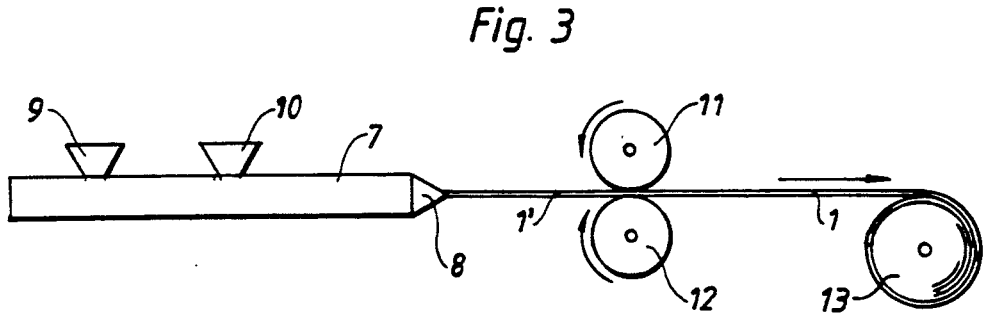
FIG. 3 is a schematic illustration of an arrangement for the manufacture of the packing material.

The material in web form 1 described above can be manufactured with the help of an arrangement of the type shown schematically in FIG. 3. The arrangement comprises an extruder 7 with a suitably dimensioned nozzle 8 and two feed-funnels 9 and 10 for charging the starting material necessary for the extrusion, that is to say granulated propylene-based polymer with a melt index of between 0.5 and 5 according to ASTM (2.16 kg, 230°), such as a polypropylene homopolymer or a propylene-ethylene copolymer, and mineral filler respectively. The thermoplastic mass containing between 50% and 80%, 65%, by weight of filler is heated to softening or incipient melting (approx. 180°-300° C.), and is extruded through the nozzle 8 to form a 100–400 μm, e.g. 300 μm, film 1'. The film 1' is passed through the nip between cooperating, cooled pressure cylinders 11 and 12. One cylinder 11 is provided on its outer surfaces with a pattern formed by raised surface or matrices which are pressed against the film 1' to deposit a complementary surface pattern on one side of the film formed through plastic deformation to produce the crease lines 5 and 6. The cooled film 1 provided with crease lines subsequently can be rolled up on a magazine roll 13.

Figure 4:
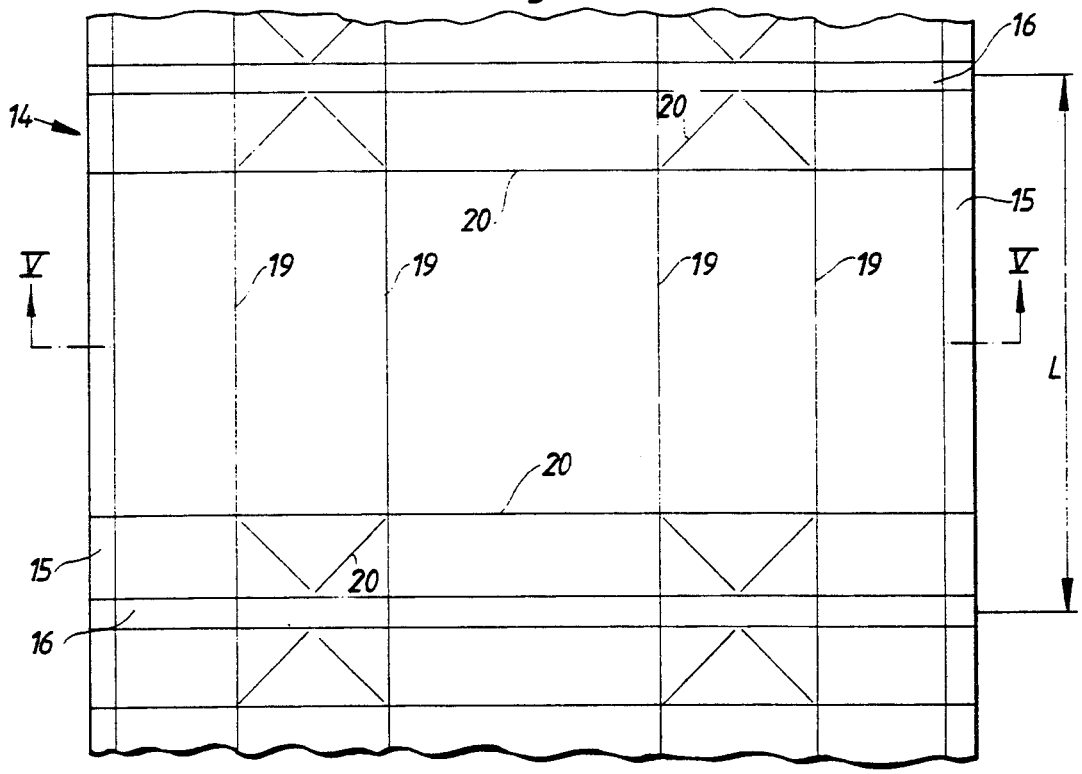
FIG. 4 is a plan view of a packing material in web form in accordance with a second embodiment of the present invention.
Figure 5A:
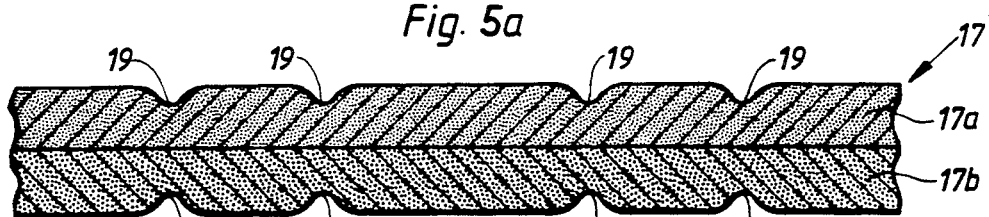
FIG. 5a is an enlarged cross-sectional view of the material in FIG. 4 along the line V—V.

FIG. 4 and FIG. 5a show to a whole package length L of a packing material in web form in accordance with a second embodiment of the present invention which has been given the general reference designation 14. From the material web 14 are manufactured filled, liquid-tight packing containers, as described previously, wherein longitudinal edge zones 15 of the web 14 are joined to one another in an overlap joint so as to form a tube which subsequently is filled with the intended contents. The filled tube is separated thereafter into sealed container units by means of repeated flattening and sealing of the tube along transverse sealing zones 16 at right angles to the longitudinal axis of tube. Thereafter the container units are given the desired geometrical endform, e.g. parallellepipedic, by a further folding and sealing operation.

As is evident from FIG. 5a the material according to this embodiment comprises a base 17 consisting of base layers 17a and 17b laminated to one another which are manufactured by means of extrusion of a mixture containing a mineral-filled propylene-based polymer with a melt index of between 0.5 and 5 according to ASTM (2.16 kg, 230° C.) and between 50% and 80%, preferably 65-70%, calculated on the total weight of the mixture, of a particulate, inorganic mineral filler. The propylene-based polymer with a melt index within the above specified range may be a propylene homopolymer with a melt index of below 1 according to ASTM (2.16 kg, 230° C.), but for reasons described earlier is preferably a propylene-ethylene copolymer.

The filler used in the propylene-based polymer of the base layers 17a and 17b may be mica, talc, calcium salts such as calcium sulphate or calcium carbonate etc. In the example shown it is assumed, however, that one base layer 17a, that is the one facing towards the inside of the intended packing container, contains mica, whereas the other base layer 17b contains calcium carbonate in particle form with a grain size of under 10 μm. The thickness of the respective base layers 17a and 17b included in the base 17 may vary between 50–200, but out of practicle considerations the thickness of the respective base layers is preferably 100 μm.

Figure 5B:
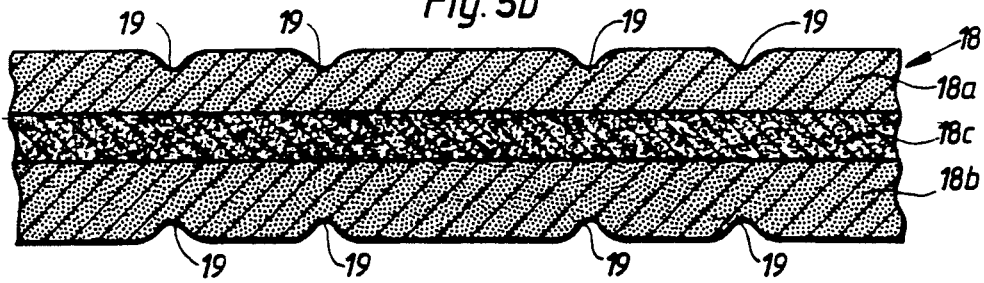
FIG. 5b is a cross-sectional view similar to that in FIG. 5a of a packing material in accordance with a further embodiment of the present invention.

FIG. 5b shows a cross section corresponding to that in FIG. 5a of a packing material in accordance with a further embodiment of the invention. According to this further embodiment the material comprises a base 18 with outer base layers 18a and 18b of the same material as the base layers 17a and 17b described above with reference to FIG. 5a, which are joined to one another by an intermediate layer 18c of a foamed or density-reduced propylene-based polymer with a melt index of between 0.5 and 5 according to ASTM (2.16 kg, 230° C.).

The total material thickness of the base 18 may vary, but out of practical considerations is usually approximately 300 μm, all the layers included in the base 18 preferably having the same mutual layer thickness, that is to say 100 μm.

To facilitate the folding of the web 14 in the manufacture of packing containers in the manner described above, the web 14, as is evident from FIG. 4, has been provided with an arbitrary pattern of longitudinal and transverse crease lines 19 and 20 respectively. These crease lines (only the longitudinal crease lines 19 whereof are shown in FIG. 5a) have been formed by a plastic deformation of the one side or as in the example shown, of both sides of the base 17. In the same manner corresponding crease lines, which for the sake of greater clarity have been given the same reference designations as in FIG. 5a, have been formed in the base 18 shown in FIG. 5b.

Figure 6:
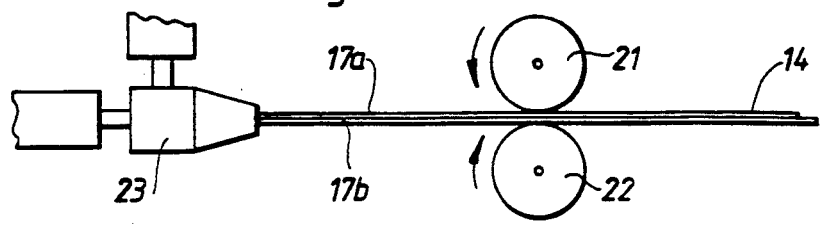

FIG. 6 shows schematically an arrangement for the manufacture of the web 14 in accordance with the invention shown in FIG. 4 and FIG. 5a. The arrangement comprises a coextruder of a known type having with a suitably dimensioned nozzle 23 comprising two slot-shaped openings through which respective base layers 17a and 17b included in the material are coextruded from starting material necessary for the respective layers. The web 14 laminated from the co-extruded base layers is passed through the nip between two co-operating, coold pressure cylinders 21 and 22 while the web is soft. The outer surfaces of the cylinders 21, 22 are provided with raised portions or matrices of a design which is such that when pressed against the web 14 while the web 14 is passing between the two cylinders they produce a pattern of crease lines on both sides of the web by plastic deformation. The crease lines facilitate folding of the web. The cooled web 14 provided with crease lines can subsequently be rolled up on a magazine roll which is not shown. In a similar manner the weblike packing material in accordance with the further embodiment shown in FIG. 5b can be manufactured. In that case, the extruder includes a nozzle with three slot-shaped openings so as to make possible a co-extrusion of the three layers 18a–18c included in the base 18.

While this invention has been illustrated and described in accordance with a preferred embodiment, it is recognized that variations and changes may be made and equivalents employed herein without departing from the invention as set forth in the claims.

What is claimed is:

1. A web for liquid tight packing containers comprising:
   a first extruded base layer of mineral-filled thermoplastic material having between about 50% and about 80%, based on the total weight of the thermoplastic material, of an inorganic particulate mineral filler, said thermoplastic material being a propylene-based polymer having a melt index of between 0.5 and 5.0 according to ASTM (2.16 kg, 230° C.), said first base layer being provided with a plurality of crease lines in a surface of said first base layer, said crease lines being formed, through plastic deformation, concurrently with the extrusion of the first base layer or immediately thereafter while the first base layer is in a softened state;
   a second extruded base layer which is laminated to the first base layer, one of said first and second base layers containing mica and the other base layer including calcium salt, whereby when the web is formed into a container, the base layer containing mica is on the interior of the container; and
   an intermediate layer of foamed propylene-based polymer positioned between said first and second base layers and joining said two base layers together, said foamed propylene-based polymer of said intermediate layer having a melt index of between 0.5 and 5.0 according to ASTM (2.16 kg. and 230° C.).

2. The web according to claim 1, wherein said calcium salt is calcium sulphate.

3. The web according to claim 1, wherein said calcium salt is calcium carbonate.

4. The web according to claim 1, wherein said first and second base layers are co-extruded.

5. The web according to claim 1, wherein the thickness of each of said base layers is between about 50 μm and 200 μm and said base layers are flexible.

6. The web according to claim 1, wherein said base layers and said intermediate layer are co-extruded.

7. The web according to claim 1, wherein said base layer has oppositely positioned side edges, some of said crease lines extending from one side edge to the oppositely positioned side edge of the base layer.

* * * * *